United States Patent [19]
Pelegris

[11] Patent Number: 5,410,443
[45] Date of Patent: Apr. 25, 1995

[54] TELEPHONE LINE OVERVOLTAGE PROTECTION

[75] Inventor: Dimitris J. Pelegris, Mount Prospect, Ill.

[73] Assignee: Oneac Corporation, Libertyville, Ill.

[21] Appl. No.: 23,604

[22] Filed: Feb. 26, 1993

[51] Int. Cl.[6] .............................................. H02H 9/04
[52] U.S. Cl. ...................................... 361/119; 361/127
[58] Field of Search ................. 361/119, 127; 379/412; 439/715

[56] References Cited

U.S. PATENT DOCUMENTS

| | | | |
|---|---|---|---|
| Re. 30,724 | 8/1981 | Klayum et al. | 361/124 |
| 3,573,695 | 4/1971 | Geyer et al. | 337/29 |
| 3,755,715 | 8/1973 | Klayum et al. | 361/120 |
| 4,020,398 | 4/1977 | McKnight | 361/60 |
| 4,037,266 | 7/1977 | English et al. | 361/120 |
| 4,116,524 | 9/1978 | DeNigris et al. | 439/490 |
| 4,159,500 | 6/1979 | Baumbach et al. | 361/119 |
| 4,327,393 | 4/1982 | Hines et al. | 361/119 |
| 4,584,624 | 4/1986 | Hines | 361/119 |
| 4,616,288 | 10/1986 | Scholtholt et al. | 361/119 |
| 4,658,325 | 4/1987 | Splitt | 361/119 |
| 4,710,846 | 12/1987 | Heisinger | 361/119 |
| 4,758,920 | 7/1988 | McCartney | 361/119 |
| 4,758,921 | 7/1988 | Hung | 361/119 |
| 4,941,063 | 7/1990 | McCartney et al. | 361/119 |
| 5,025,345 | 6/1991 | Marks | 361/119 |

OTHER PUBLICATIONS

Spec. sheet by Anixter Bros., Inc. 1991, "*Building Entrance Protectors—Indoor*"; pp. 12–88.

Spec. sheets by GTE Products Corporation; "Solid-State Surge Arrester SS8B/SS7B", 1989.

Spec. sheet by Anixter Bros., Inc. 1991, "Screw-In Protector Modules"; pp. 12–82.

Spec. sheet by Graybar, 1987 "*Station Protectors*"pp. 10–42.

U.S. patent application Ser. No. 07/895,380; Filed Jun. 8, 1992.

*Primary Examiner*—Todd E. De Boer
*Attorney, Agent, or Firm*—Mason, Kolehmainen, Rathburn & Wyss

[57] ABSTRACT

A telephone line overvoltage protection method and assembly are provided. The telephone line overvoltage protection assembly includes a telephone line station protector having at least first and second threaded arrester wells coupled to a telephone line pair to be protected, an adapter base, and a plug-in type telephone line overvoltage protector module mounted to the adapter base and having TIP, RING and ground pins. The adapter base includes TIP, RING and ground sockets for removably receiving the TIP, RING and ground pins of the overvoltage protector. First and second mounting legs project from the adapter base for being fixedly inserted into the first and second threaded arrester wells. First and second electrodes extend from the first and second mounting legs for electrical connection with the TIP and RING sockets and the arrester wells. A grounding clip on the adapter base is coupled to the ground socket and is coupled to the first and second bushings when the first and second mounting legs are inserted into the first and second arrester wells.

17 Claims, 2 Drawing Sheets

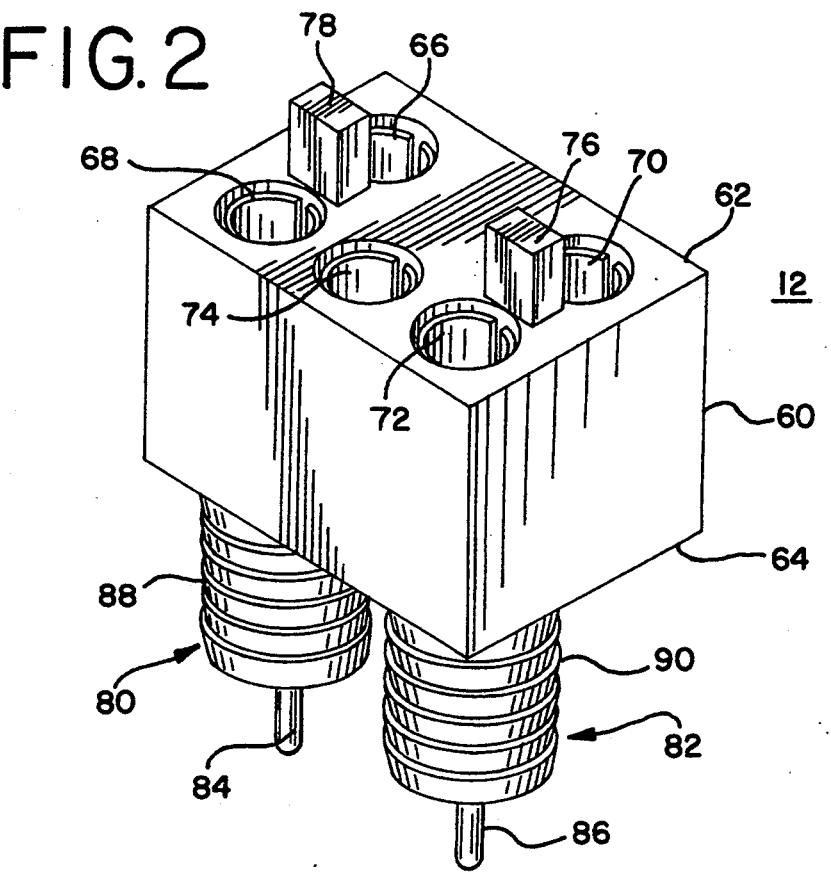
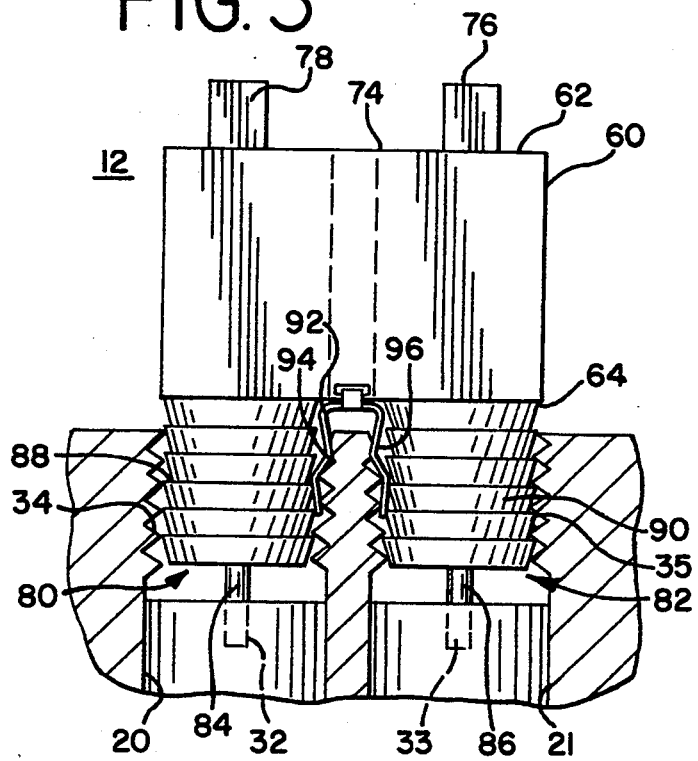
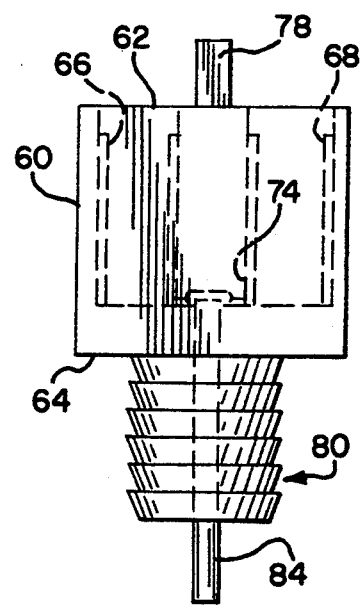

TELEPHONE LINE OVERVOLTAGE PROTECTION

BACKGROUND OF THE INVENTION

1. Field of the Invention

The present invention relates generally to telephone line overvoltage protection devices, and, more particularly, to an improved overvoltage protection method and assembly used with a threaded well type protector station.

2. Description of the Prior Art

Overvoltage protection devices are commonly used with telephone lines for protecting telephone equipment against hazardous voltages due to lightning or power surges. Existing threaded well type protector stations typically are used with screw-in or threaded enclosure types of carbon block or gas tube protectors.

Many such known protective arrangements do not provide balanced operation in a failure mode to simultaneously shunt both the TIP and RING to ground. For example, a first carbon block protector having a spark gap formed between opposed carbon electrodes has one of the electrodes coupled to either the TIP or RING of the telephone line pair to be protected and the other electrode coupled to ground potential. A second carbon block protector is connected to the other of the TIP or RING of the telephone line pair to be protected. The first and second carbon block protectors do not provide balanced operation in a failure mode. Gas tube protectors are similarly arranged. Another significant disadvantage of utilizing an inert gas filled overvoltage arrester device is the response time or delay that can take place between the time the voltage surge occurs and the breakdown of the spark gap.

Overvoltage protection circuitry that overcomes many disadvantages of the prior art circuitry is disclosed in McCartney, U.S. Pat. Nos. 4,758,920, issued Jul. 19, 1988, and McCartney et al., 4,941,063, issued Jul. 10, 1990, and both assigned to the assignee of the present invention.

Related U.S. patent application Ser. No. 07/895,380, filed on Jun. 8, 1992, by the present inventor and assigned to the assignee of the present invention and now abandoned, discloses a telephone line overvoltage protection method and apparatus configured as a five-pin plug-in type protector module containing solid-state devices. The disclosed solid-state devices respond to overvoltage conditions on telephone lines faster than gas tube or carbon type arresters and operate in a balanced failure mode to :shunt: to ground both the TIP line and the RING line of a pair of telephone lines when an overvoltage or power surge occurs on either line. A failure mode mechanism of the overvoltage device connects the telephone lines to ground when an abnormal temperature increase results from an overvoltage condition or the like occurs.

A need exists for an overvoltage protection device for use with a conventional threaded well type protector station that overcomes the disadvantages of available devices.

SUMMARY OF THE INVENTION

Accordingly, important objects of the present invention are to provide a new and improved overvoltage protection assembly and method to be used in threaded well type protector stations; to provide a new and improved adapter that is readily insertable into a pair of threaded wells within a protector station to facilitate use of a plug-in type protector; and to provide a new and improved overvoltage protection assembly and method overcoming many of the disadvantages of known telephone line overvoltage protection arrangements.

In brief, the objects and advantages of the present invention are achieved by a telephone line overvoltage protection method and assembly. The telephone line overvoltage protection assembly includes a telephone line station protector having at least first and second threaded arrester wells coupled to a telephone line pair to be protected, an adapter base, and a plug-in type telephone line overvoltage protector module mounted to the adapter base and having TIP, RING and ground pins. The adapter base includes TIP, RING and ground sockets for removably receiving the TIP, RING and ground pins of the overvoltage protector. First and second mounting legs project from the adapter base for being fixedly inserted into the first and second threaded arrester wells. First and second electrodes extend from the first and second mounting legs for electrical connection with the TIP and RING sockets and the arrester wells. A grounding clip on the adapter base is coupled to the ground socket and is coupled to the first and second bushings when the first and second mounting legs are inserted into the first and second arrester wells.

An adapter for mounting a plug-in type overvoltage protection device in a protector includes an adapter base having a top surface and a bottom surface. A pair of TIP sockets, a pair of RING sockets and a ground socket extend into the adapter base from the top surface; and a pair of mounting legs or posts extend from the bottom surface of the adapter base. The sockets are arranged in the adapter base so as to conform to the footprint of the input and output TIP pins, the input and output RING pins and the ground pin of a typical 5-pin plug-in type overvoltage device or module. The TIP sockets are adapted to receive the TIP pins of the plug-in type overvoltage module and are coupled within the adapter base to a TIP electrode that extends from the adapter base through one of the mounting legs. In a similar manner, the RING sockets are adapted to receive the RING pins of the plug-in type overvoltage module and are coupled within the adapter base to a RING electrode extending from the adapter base through the other of the mounting legs. The ground socket is adapted to receive the ground pin of the plug-in type overvoltage module and is coupled to a ground clip that is secured to the bottom wall of the adapter base between the mounting legs. The top surface of the adapter additionally includes keys or stakes extending from the top surface that insure that only appropriate types of plug-in overvoltage modules having matching keying recesses can be installed in the adapter.

BRIEF DESCRIPTION OF THE DRAWING

These and other objects and advantages of the present invention will become readily apparent upon consideration of the following detailed description of the embodiment of the invention shown in the accompanying drawings wherein:

FIG. 2 is a perspective view of an adapter of an overvoltage protection assembly illustrated in FIG. 1;

FIG. 3 is a front view of the adapter of FIG. 2 as mounted in a pair of adjacent arrester wells of the threaded well type protector station of FIG. 1; and FIG. 4 is a side view of the adapter of FIG. 2.

DETAILED DESCRIPTION OF THE PREFERRED EMBODIMENT

Figure 1:
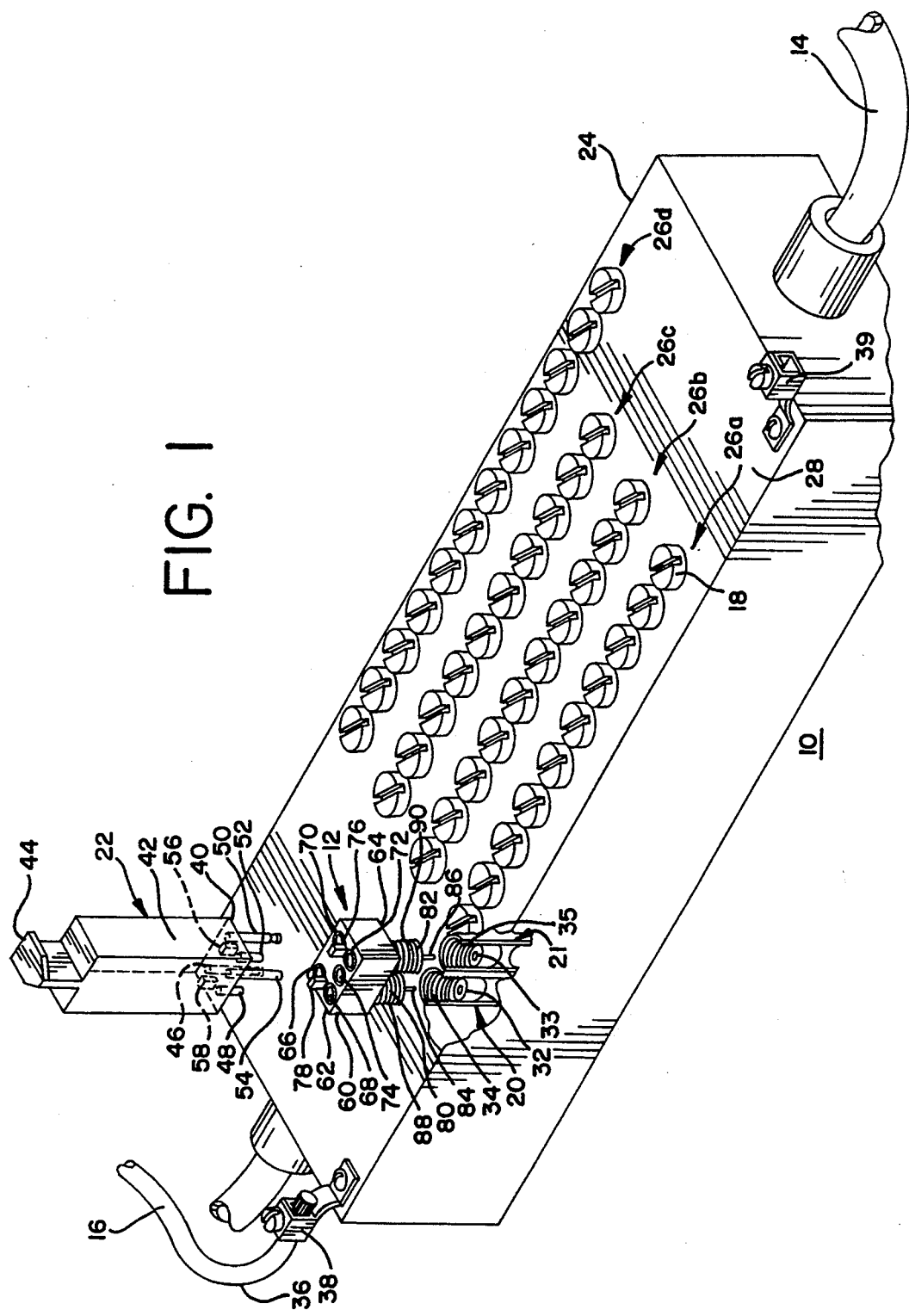
FIG. 1 is a partially cutaway, perspective view of a threaded well type protector station illustrating an overvoltage protection assembly embodying the present invention.

Referring now more specifically to FIG. 1 of the drawings, there is shown a threaded well type protector station 10 including an adapter generally designated by the reference numeral 12 and a plug-in type protector module 22 defining an overvoltage protection assembly embodying the present invention. The protector 10 typically is used at a station, such as an apartment or office building, to which pairs of telephone lines 14 are connected. One such type of protector is an AT&T 134-type protector. The telephone lines 14 extending into the station protector 10 may be considered input telephone lines and pairs of telephone lines 16 extending out from the station protector 10 to equipment at the station can be considered output telephone lines.

In order to protect equipment or the like at the station that are coupled to the output telephone lines 16 from overvoltage or surge currents that may occur on the telephone lines 14, the protector 10 includes protectors, such as a gas tube or carbon type protector 18, that are disposed in threaded wells, such as the wells 20 and 21. Each of the protectors 18 has a spark gap (not shown) that is coupled between one of the telephone lines 14 to be protected and ground potential. In the event an overvoltage or surge current occurs on one of the telephone lines 14 to which the protector 18 is coupled, the spark gap closes, thereby coupling that protected telephone line 14 to ground.

Instead of utilizing a gas tube or carbon type of protector like the protector 18 to protect the telephone lines 14, the plug-in type protector module 22 advantageously is used to protect the telephone lines 14 and thereby the corresponding telephone lines 16, with the adapter 12 used to mount the protector module 22 to the station protector 10.

The protector 10 has a generally rectangular housing or base 24 made of a dielectric material. Four rows 26a, 26b, 26c and 26d of arrester wells are located along a top surface 28 of the protector base 24. As illustrated in connection with the arrester wells 20 and 21 in FIG. 1, each of the arrester wells in the rows 26a, 26b, 26c and 26d has a line contact member 32, 33 disposed at the bottom or base of the well 20, 21. The line contact member 32 is adapted to be coupled to one of the input telephone lines 14 and a corresponding output telephone line 16 and the line contact member 33 is adapted to be coupled to another of the input telephone lines 14 and a corresponding output telephone line 16. An internally threaded bushing or RING 34, 35 is disposed about the top of the well 20, 21. The bushing 34, 35 is adapted to threadedly receive the protector 18 and is coupled to ground through a grounding strap or wire 36 secured at the top surface 28 of the protector 10 by a ground clamp 38. Another ground clamp 39 similarly is coupled to the bushings 34, 35 and can be coupled to ground. When the protector 18 is screwed in place into the arrester well 20, 21, one of the electrodes in the protector 18 is coupled to ground potential via the threaded bushing 34, 35 and the ground wire 36 and the other electrode is coupled to one of the telephone lines 14 and 16 via the line contact member 32, 33.

Protector 18, whether it is a gas tube type protector or a carbon type protector, provides the telephone lines 14 and 16 with a certain amount of protection from overvoltages or surge currents that occur on the telephone lines 14. However, plug-in type protector modules or assemblies, such as the protector module 22, can provide improved protection because the protector module 22 can include solid-state devices that react faster to overvoltage conditions occurring on the telephone lines 14 than the response time provided by gas tube or carbon types of arresters.

The protector module 22 may be of the general type described in copending U.S. patent application Ser. No. 07/895,380, filed on Jun. 8, 1992, that includes such solid-state devices. The disclosure of the above-identified application is incorporated herein by reference. The protector module 22 has a lower base unit 40 and a cover 42 that forms an outer housing. A finger gripping portion 44 projects from the top of the cover 42 so that the protector module 22 may be easily installed, as for example, in the adapter 12. An input TIP pin 46 and an output TIP pin 48, an input RING pin 50 and an output RING pin 52 and a ground pin 54 project from the base 40 of the protector module 22. As is shown in FIG. 1 of copending U.S. patent application Ser. No. 07/895,380, the TIP input pin 46 and the RING input pin 50 of the overvoltage module or assembly 22 may be coupled to solid-state devices that react to any overvoltage or surge currents occurring on a telephone line coupled to the TIP input pin 46 or the RING input pin 50 by coupling the pins 46 and 50 to the ground pin 54. The base unit 40 of the protector module 22 also contains keying recesses 56 and 58 that, as will be discussed hereinafter, insure that only appropriate protector modules 22 can be installed on the adapter 12.

As previously indicated, the adapter 12 enables the protector module 22 to be installed on the protector 10 even though the protector 10 has been installed at a station and even though the protector 10 is designed only to use the screw-in type gas tube or carbon type arresters, such as the arrester 18. The adapter 12 is made of a dielectric material and has an adapter base 60 that extends between a top surface 62 and a bottom surface 64. A pair of TIP sockets 66 and 68, a pair of RING sockets 70 and 72 and a ground socket 74 extend into the adapter base 60 from the top surface 62 toward the bottom surface 64. In addition, the top surface 62 of the adapter base 60 is provided with a pair of keying stakes 76 and 78 that project away from the top surface 62. A pair of mounting legs or posts 80 and 82 project away from the bottom surface 64 of the adapter base 60. The mounting post 80 has a TIP electrode 84 extending from the post 80. The TIP electrode 84 extends through the mounting post 80 and is coupled to both the TIP input socket 66 and TIP output socket 68 (see FIG. 4). Similarly, the mounting post 82 has a RING electrode 86 extending therefrom. The RING electrode 86 extends through the mounting post 82 and is coupled to both the RING input socket 70 and the RING output socket 72.

In the case of a protector like the protector 10, the rows 26a, 26b, 26c, , and 26d of threaded wells 26 into which carbon type or gas tube type overvoltage arresters 18 may be screwed into place are arranged in the protector base 24 so that the TIP and RING telephone lines for a given pair of input telephone lines 14 are connected to contacts 32 and 33 located at the base of two adjacent wells 20 and 21. The mounting legs 80 and 82 of the adapter 12 are spaced apart so that the center line of the mounting legs 80 and 82 are the same distance apart as the center lines of the adjacent wells 20 and 21. As a result, the mounting legs 80 and 82 can be inserted into the adjacent wells 20 and 21.

As the mounting legs 80 and 82 are inserted respectively into the adjacent wells 20 and 21, cam surfaces 88, formed about the outer periphery of the mounting leg 80, interact with the threaded bushing 32 at the top of the well 20 and cam surfaces 90, formed about the outer periphery of the mounting leg 82, interact with the threaded bushing 33 at the top of the well 21 so that the adapter 12 is latched or fixedly secured within the adjacent wells 20 and 21. When the mounting legs 80 and 82 are so latched in the wells 20 and 21, the TIP electrode 84 makes contact with the line contact 32 in the base of the well 20 and the RING electrode 86 makes contact with the line contact 33 in the base of the well 21. In addition, a ground clip 92 is mounted between the legs 80 and 82 and is coupled to the ground socket 74 (see FIG. 3). The ground clip 92 includes resilient leg portions 94 and 96 that are forced against the threaded bushings 34 and 35 at the top of the adjacent wells 20 and 21. The threaded bushings 34 are grounded, and consequently, the ground socket 74 of the adapter 12 likewise is grounded through the ground clip 92.

The TIP sockets 66 and 68, the RING sockets 70 and 72 and the ground socket 74 are arranged in the adapter base 60 so as to conform to the footprint of the input TIP pin 46, the output TIP pin 48, the input RING pin 50, the output RING pin 52 and the ground pin 54 of the plug-in type overvoltage module or assembly 22. As a result, the plug-in protector module 22 can be mounted or installed on the adapter 12 by applying pressure against the finger grip 44 so that the pins 46, 48, 50, 52 and 54, respectively, will be inserted into and make contact with the sockets 66, 68, 70, 72 and 74. With the TIP pins 46 and 48 of the plug-in type overvoltage module 22 lodged in the TIP sockets 66 and 68, the TIP pins 46 and 48 are coupled to the TIP electrode 84; with the RING pins 50 and 52 of the plug-in type overvoltage module 22 lodged in the pin sockets 70 and 72, the RING pins 50 and 52 are coupled to the RING electrode 86; and with the ground pin 54 of the plug-in type overvoltage module 22 lodged in the ground socket 74, the ground pin 54 is coupled to the ground clip 92.

As previously indicated, the adapter 12 is provided with the keying stakes 76 and 78 that project from the top surface 62 of the adapter 12. The protector module 22 includes corresponding keying recesses 56 and 58 into which the keying stakes 76 and 78 will be disposed when the protector module 22 is mounted on the adapter 12. If the protector module 22 did not have such keying recesses 56 and 58, it would not be possible to mount the protector module 22 on the adapter 12. Consequently, the keying stakes 76 and 78 insure that only appropriate protector modules 22 can be installed on the adapter 12.

Advantageously, the adapter 12 enables the plug-in type protector module 22 to be used to protect telephone lines 14 extending to a protector like the protector 10 without the necessity of modifying or reconfiguring the station protector 10. Hence, the protector module 22 can be used to replace gas tube or carbon screw-in type protectors like the protector 18 in protectors 10 that already are installed at a given station.

While the invention has been described with reference to details of the illustrated embodiment, these details are not intended to limit the scope of the invention as defined in the appended claims.

What is claimed and desired to be secured by Letters Patent of the United States is:

1. An telephone line overvoltage protection assembly used with a telephone line station protector having at least first and second threaded arrester wells, said first arrester well having first bushing means and first line contact means coupled to a telephone TIP line to be protected; and said second arrester well having second bushing means and second line contact means coupled to a telephone RING line to be protected, said assembly comprising:
    an adapter base;
    a plug-in type telephone line overvoltage protector module mounted to said adapter base and having TIP, RING and ground pins; said adapter base including;
    TIP, RING and ground socket means for removably receiving said TIP, RING and ground pins of said overvoltage protector;
    first and second mounting legs projecting from said adapter base, said first mounting leg being adapted to be inserted into said first arrester well and said second mounting leg being adapted to be inserted into said second arrester well;
    first electrode means extending from said first mounting leg and coupled to said TIP socket means, said first electrode means being coupled to said first line contact means when said first mounting leg is inserted into said first arrester well;
    second electrode means extending from said second mounting leg and coupled to said RING socket means, said second electrode means being coupled to said second line contact means when said second mounting leg is inserted into said second arrester well; and
    grounding means disposed on said adapter base coupled to said ground socket means, said grounding means being coupled to said first and second bushing means when said first and second mounting legs are inserted into said first and second arrester wells.

2. An adapter for mounting a plug-in type telephone line overvoltage protector having TIP, RING and ground pins on a telephone line station protector having at least first and second arrester wells, said first arrester well having first bushing means and first line contact means coupled to a telephone TIP line to be protected and said second arrester well having second bushing means and second line contact means coupled to a telephone RING line to be protected, said adapter comprising:
    an adapter base defining TIP, RING and ground socket means for receiving said TIP, RING and ground pins of said overvoltage protector;
    first and second mounting legs projecting from said adapter base, said first mounting leg being adapted to be inserted into said first arrester well and said second mounting leg being adapted to be inserted into said second arrester well;
    first electrode means extending from said first mounting leg and coupled to said TIP socket means, said first electrode means being coupled to said first line contact means when said first mounting leg is inserted into said first arrester well;

second electrode means extending from said second mounting leg and coupled to said RING socket means, said second electrode means being coupled to said second line contact means when said second mounting leg is inserted into said second arrester well; and grounding means disposed on said adapter base coupled to said ground socket means, said grounding means being coupled to said first and second bushing means when said first and second mounting legs are inserted into said first and second arrester wells.

3. An adapter as set forth in claim 2 wherein said adapter base is made of a dielectric material.

4. An adapter as set forth in claim 2 wherein said overvoltage protector has a pair of TIP pins and a pair of RING pins and wherein said TIP socket means includes a pair of TIP sockets into which said pair of TIP pins are inserted and said RING socket means includes a pair of RING sockets into which said pair of RING pins are inserted.

5. An adapter as set forth in claim 4 wherein said first electrode means extends through said first mounting leg into said adapter base and is coupled to each of said pair of TIP sockets and said second electrode means extends through said second mounting leg into said adapter base and is coupled to each of said pair of RING sockets.

6. An adapter as set forth in claim 2 wherein said first and second arrester wells are disposed adjacent each other and said first and second mounting legs are spaced apart so that said first and second mounting legs can be inserted into said adjacent first and second arrester wells.

7. An adapter as set forth in claim 2 wherein said station protector includes a ground connecting means and said first and second bushing means are coupled to said ground connecting means.

8. An adapter as set forth in claim 2 wherein each of said first and second bushing means includes a threaded portion and said first and second mounting legs each has cam surfaces on the outer peripheral surface thereof such that said cam surfaces and said threaded portions of said first and second bushing means secure said first and second mounting legs in said first and second arrester wells.

9. An adapter as set forth in claim 2 wherein said grounding means includes a ground clip means disposed between said first and second mounting legs and coupled to said ground socket means, said ground clip means being coupled to said first and second bushing means when said first and second mounting legs are inserted into said first and second arrester wells.

10. An adapter as set forth in claim 9 wherein said ground clip means includes resilient leg portions that are forced against said first and second bushing means when said first and second mounting legs are inserted into said first and second arrester wells.

11. An adapter as set forth in claim 2 wherein said adapter base includes adapter keying means preventing said TIP, RING and ground pins of said overvoltage protector from being inserted into said TIP, RING and socket means unless said overvoltage protector has corresponding protector keying means.

12. An adapter as set forth in claim 11 wherein said adapter keying means includes keying stakes and said protector keying means includes recesses into which said stakes can become disposed.

13. An overvoltage protector assembly including a plug-in type telephone line overvoltage protector having line and ground pins and a telephone line protector station having an arrester well with bushing means and with line contact means that are coupled to a telephone line to be protected and an adapter for mounting said overvoltage protector on said station protector comprising:

an adapter base defining line and ground socket means for receiving said line and ground pins of said overvoltage protector;

mounting means projecting from said adapter base for fixedly mounting into said arrester wells;

electrode means extending from said mounting means and coupled to said line socket means, said electrode means being coupled to said line contact means when said mounting means is inserted into said arrester well; and grounding means disposed on said adapter base and coupled to said ground socket means, said grounding means being coupled to said bushing means when said mounting means is inserted into said arrester well.

14. An overvoltage protector assembly as set forth in claim 13 wherein said bushing means includes a threaded portion and said mounting means includes cam surfaces on the outer peripheral surface thereof, such that said cam surfaces and said threaded portion of said bushing means secure said mounting means in said arrester well.

15. An overvoltage protector assembly as set forth in claim 13 wherein said station protector has ground connecting means and said bushing means is coupled to said ground connecting means.

16. An overvoltage protector assembly as set forth in claim 13 wherein said grounding means has a resilient clip portion that is forced against said bushing means when said mounting means is inserted into said arrester well.

17. A telephone line overvoltage protector method comprising the steps of:

providing an adapter base for mounting a multiple-pin overvoltage protector to a threaded well protector station; said adapter base defining TIP, RING and ground socket means for receiving said TIP, RING and ground pins of said overvoltage protector and having first and second outwardly extending mounting legs for engagement with said first threaded well and a second threaded well of said protector station; and fixedly securing said mounting legs into said first and second threaded wells of said protector station; and removably inserting said TIP, RING line and ground pins of said overvoltage protector into said TIP, RING and ground socket means of said adapter.

* * * * *